United States Patent
Pezeshki et al.

(10) Patent No.: US 12,047,987 B2
(45) Date of Patent: Jul. 23, 2024

(54) ENERGY PER RESOURCE ELEMENT RATIO FOR NON-ZERO POWER CHANNEL STATE INFORMATION REFERENCE SIGNALS

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US); Lei Xiao, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 11 days.

(21) Appl. No.: 17/172,942

(22) Filed: Feb. 10, 2021

(65) Prior Publication Data

US 2021/0258970 A1    Aug. 19, 2021

Related U.S. Application Data

(60) Provisional application No. 62/982,688, filed on Feb. 27, 2020, provisional application No. 62/977,118, filed on Feb. 14, 2020.

(51) Int. Cl.
*H04L 5/00* (2006.01)
*H04W 72/541* (2023.01)

(52) U.S. Cl.
CPC ......... *H04W 72/541* (2023.01); *H04L 5/0051* (2013.01)

(58) Field of Classification Search
CPC .. H04B 7/0626; H04B 17/345; H04B 17/309; H04L 5/0073; H04W 24/10
See application file for complete search history.

(56) References Cited

U.S. PATENT DOCUMENTS

| | | |
|---|---|---|
| 2018/0269939 A1 | 9/2018 | Hu et al. |
| 2019/0058517 A1* | 2/2019 | Kang ................. H04B 7/0626 |
| 2019/0207737 A1* | 7/2019 | Babaei ................ H04W 76/11 |
| 2020/0358540 A1* | 11/2020 | Yokomakura ....... H04B 7/0626 |

(Continued)

FOREIGN PATENT DOCUMENTS

| | | | |
|---|---|---|---|
| WO | 2013081368 A1 | 6/2013 | |
| WO | WO-2019139140 A1 * | 7/2019 | .......... H04B 17/309 |

OTHER PUBLICATIONS

International Search Report and Written Opinion—PCT/US2021/017691—ISA/EPO—dated May 31, 2021.

(Continued)

*Primary Examiner* — Yee F Lam
(74) *Attorney, Agent, or Firm* — Patterson+ Sheridan, L.L.P.

(57) ABSTRACT

Certain aspects of the present disclosure provide techniques for determining an energy per resource element (EPRE) ratio for non-zero power (NZP) channel state information reference signals (CSI-RSs) when a device is measuring a wireless channel. A method that may be performed by a user equipment (UE) includes determining, based on an indication, an energy per resource element (EPRE) ratio for a non-zero power (NZP) channel state information reference signal (CSI-RS) resource; and measuring a channel based on the determined EPRE ratio and CSI-RSs associated with the NZP CSI-RS resource.

27 Claims, 12 Drawing Sheets

(56) References Cited

U.S. PATENT DOCUMENTS

2021/0105739 A1* 4/2021 Lin .................. H04W 68/02
2021/0258059 A1* 8/2021 Onggosanusi ........ H04L 5/0073

OTHER PUBLICATIONS

Nokia: "Introduction of NR Enhanced MIMO," 3GPP Draft, 3GPP TSG-RAN WG1 Meeting #99, RP-192641, 3rd Generation Partnership Project (3GPP), Mobile Competence Centre; 650, Route Des Lucioles; F-06921, Sophia- Antipolis Cedex; France, vol. RAN WG1, No. Reno, USA; Nov. 18, 2019-Nov. 22, 2019, Dec. 7, 2019 (Dec. 7, 2019), XP051838480, 50 pages, Retrieved from the Internet: URL: https://ftp.3gpp.org/tsg_ran/TSG_RAN/TSGR_86/Docs/RP-192641.zip 38214_CR0055 (Rel-16) R1-1913655.docx [retrieved on Dec. 7, 2019], Sections 5.2.1.2, 5.2.1.4.1.

ZTE: "Clarification on PcSS", 3GPP Draft, 3GPP TSG RAN WG1 Meeting #97, R1-1906258 Clarification on PCSS, 3rd Generation Partnership Project (3GPP), Mobile Competence Centre; 650, Route Des Lucioles; F-06921, Sophia-Antipolis Cedex; France, vol. RAN WG1, No. Reno, USA, May 13, 2019-May 17, 2019, May 13, 2019 (May 13, 2019), XP051727711, 2 pages, Retrieved from the Internet: URL: http://www.3gpp.org/ftp/Meetings%5F3GPP%5FSYNC/RAN1/Docs/R1%2D1906258%2Ezip [retrieved on May 13, 2019] Section 2.

* cited by examiner

ENERGY PER RESOURCE ELEMENT RATIO FOR NON-ZERO POWER CHANNEL STATE INFORMATION REFERENCE SIGNALS

CROSS-REFERENCE TO RELATED APPLICATIONS

This application claims benefit of and priority to U.S. Provisional Patent Application No. 62/977,118, filed Feb. 14, 2020, and U.S. Provisional Patent Application No. 62/982,688, filed Feb. 27, 2020, which are assigned to the assignee hereof and herein incorporated by reference in their entireties as if fully set forth below and for all applicable purposes.

BACKGROUND

Field of the Disclosure

Aspects of the present disclosure relate to wireless communications, and more particularly, to techniques for determining an energy per resource element (EPRE) ratio for non-zero power (NZP) channel state information reference signal (CSI-RSs) resources when a device is measuring a wireless channel.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved wireless channel data throughput and improved channel measurement accuracy.

Certain aspects of the subject matter described in this disclosure can be implemented in a method for wireless communications by a user equipment (UE). The method generally includes: determining, based on an indication, an energy per resource element (EPRE) ratio for a non-zero power (NZP) channel state information reference signal (CSI-RS) resource; and measuring a channel based on the determined EPRE ratio and CSI-RSs associated with the NZP CSI-RS resource.

Certain aspects of the subject matter described in this disclosure can be implemented in a method for wireless communications by a base station (BS). The method generally includes: determining an energy per resource element (EPRE) ratio for a non-zero power (NZP) channel state information reference signal (CSI-RS) resource; and receiving one or more measurements determined based on the EPRE ratio for the NZP CSI-RS resource and CSI-RSs associated with the NZP CSI-RS resource.

Certain aspects of the subject matter described in this disclosure can be implemented in a method for wireless communications by a user equipment (UE). The method generally includes: determining, based on an indication, an energy per resource element (EPRE) ratio for a non-zero power (NZP) channel state information reference signal (CSI-RS) resource; and performing a layer one signal to interference and noise ratio (L1-SINR) measurement using at least the NZP CSI-RS resource without scaling a measured energy based on the EPRE ratio for the NZP CSI-RS resource.

Certain aspects of the subject matter described in this disclosure can be implemented in a method for wireless communications by a base station (BS). The method generally includes: determining an energy per resource element (EPRE) ratio for a non-zero power (NZP) channel state information reference signal (CSI-RS) resource; and receiving one or more measurements determined using at least the NZP CSI-RS resource and CSI-RSs associated with the NZP CSI-RS resource without a measured energy being scaled based on the EPRE ratio for the NZP CSI-RS resource.

Certain aspects of the subject matter described in this disclosure can be implemented in an apparatus in a wireless communications system. The apparatus generally includes: a memory; and a processor coupled to the memory and configured to: determine, based on an indication, an energy per resource element (EPRE) ratio for a non-zero power (NZP) channel state information reference signal (CSI-RS) resource; and measure a channel based on the determined EPRE ratio and CSI-RSs associated with the NZP CSI-RS resource.

Certain aspects of the subject matter described in this disclosure can be implemented in an apparatus in a wireless communications system. The apparatus generally includes: a memory; and a processor coupled to the memory and configured to: determine an energy per resource element (EPRE) ratio for a non-zero power (NZP) channel state information reference signal (CSI-RS) resource; and receive one or more measurements determined based on the EPRE ratio for the NZP CSI-RS resource and CSI-RSs associated with the NZP CSI-RS resource.

Certain aspects of the subject matter described in this disclosure can be implemented in an apparatus in a wireless communications system. The apparatus generally includes: a memory; and a processor coupled to the memory and configured to: determine, based on an indication, an energy per resource element (EPRE) ratio for a non-zero power (NZP) channel state information reference signal (CSI-RS) resource; and perform a layer one signal to interference and noise ratio (L1-SINR) measurement without scaling a measured energy based on the EPRE ratio for the NZP CSI-RS resource.

Certain aspects of the subject matter described in this disclosure can be implemented in an apparatus in a wireless communications system. The apparatus generally includes: a memory; and a processor coupled to the memory and configured to: determine an energy per resource element (EPRE) ratio for a non-zero power (NZP) channel state information reference signal (CSI-RS) resource; and receive one or more measurements determined using at least the NZP CSI-RS resource and CSI-RSs associated with the NZP CSI-RS resource without a measured energy being scaled based on the EPRE ratio for the NZP CSI-RS resource.

Certain aspects of the subject matter described in this disclosure can be implemented in an apparatus in a wireless communications system. The apparatus generally includes: means for determining, based on an indication, an energy per resource element (EPRE) ratio for a non-zero power (NZP) channel state information reference signal (CSI-RS) resource; and means for measuring a channel based on the determined EPRE ratio and CSI-RSs associated with the NZP CSI-RS resource.

Certain aspects of the subject matter described in this disclosure can be implemented in an apparatus in a wireless communications system. The apparatus generally includes: means for determining an energy per resource element (EPRE) ratio for a non-zero power (NZP) channel state information reference signal (CSI-RS) resource; and means for receiving one or more measurements determined based on the EPRE ratio for the NZP CSI-RS resource and CSI-RSs associated with the NZP CSI-RS resource.

Certain aspects of the subject matter described in this disclosure can be implemented in an apparatus in a wireless communications system. The apparatus generally includes: means for determining, based on an indication, an energy per resource element (EPRE) ratio for a non-zero power (NZP) channel state information reference signal (CSI-RS) resource; and means for performing a layer one signal to interference and noise ratio (L1-SINR) measurement without scaling a measured energy based on the EPRE ratio for the NZP CSI-RS resource.

Certain aspects of the subject matter described in this disclosure can be implemented in an apparatus in a wireless communications system. The apparatus generally includes: means for determining an energy per resource element (EPRE) ratio for a non-zero power (NZP) channel state information reference signal (CSI-RS) resource; and means for receiving one or more measurements determined using at least the NZP CSI-RS resource and CSI-RSs associated with the NZP CSI-RS resource without a measured energy being scaled based on the EPRE ratio for the NZP CSI-RS resource.

Certain aspects of the subject matter described in this disclosure can be implemented in a computer-readable medium storing computer-executable code that, when executed by a processing system, causes the processing system to perform operations generally including: determining, based on an indication, an energy per resource element (EPRE) ratio for a non-zero power (NZP) channel state information reference signal (CSI-RS) resource; and measuring a channel based on the determined EPRE ratio and CSI-RSs associated with the NZP CSI-RS resource.

Certain aspects of the subject matter described in this disclosure can be implemented in a computer-readable medium storing computer-executable code that, when executed by a processing system, causes the processing system to perform operations generally including: determining an energy per resource element (EPRE) ratio for a non-zero power (NZP) channel state information reference signal (CSI-RS) resource; and receiving one or more measurements determined based on the EPRE ratio for the NZP CSI-RS resource and CSI-RSs associated with the NZP CSI-RS resource.

Certain aspects of the subject matter described in this disclosure can be implemented in a computer-readable medium storing computer-executable code that, when executed by a processing system, causes the processing system to perform operations generally including: determining, based on an indication, an energy per resource element (EPRE) ratio for a non-zero power (NZP) channel state information reference signal (CSI-RS) resource; and performing a layer one signal to interference and noise ratio (L1-SINR) measurement without scaling a measured energy based on the EPRE ratio for the NZP CSI-RS resource.

Certain aspects of the subject matter described in this disclosure can be implemented in a computer-readable medium storing computer-executable code that, when executed by a processing system, causes the processing system to perform operations generally including: determining an energy per resource element (EPRE) ratio for a non-zero power (NZP) channel state information reference signal (CSI-RS) resource; and receiving one or more measurements determined using at least the NZP CSI-RS resource and CSI-RSs associated with the NZP CSI-RS resource without a measured energy being scaled based on the EPRE ratio for the NZP CSI-RS resource.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
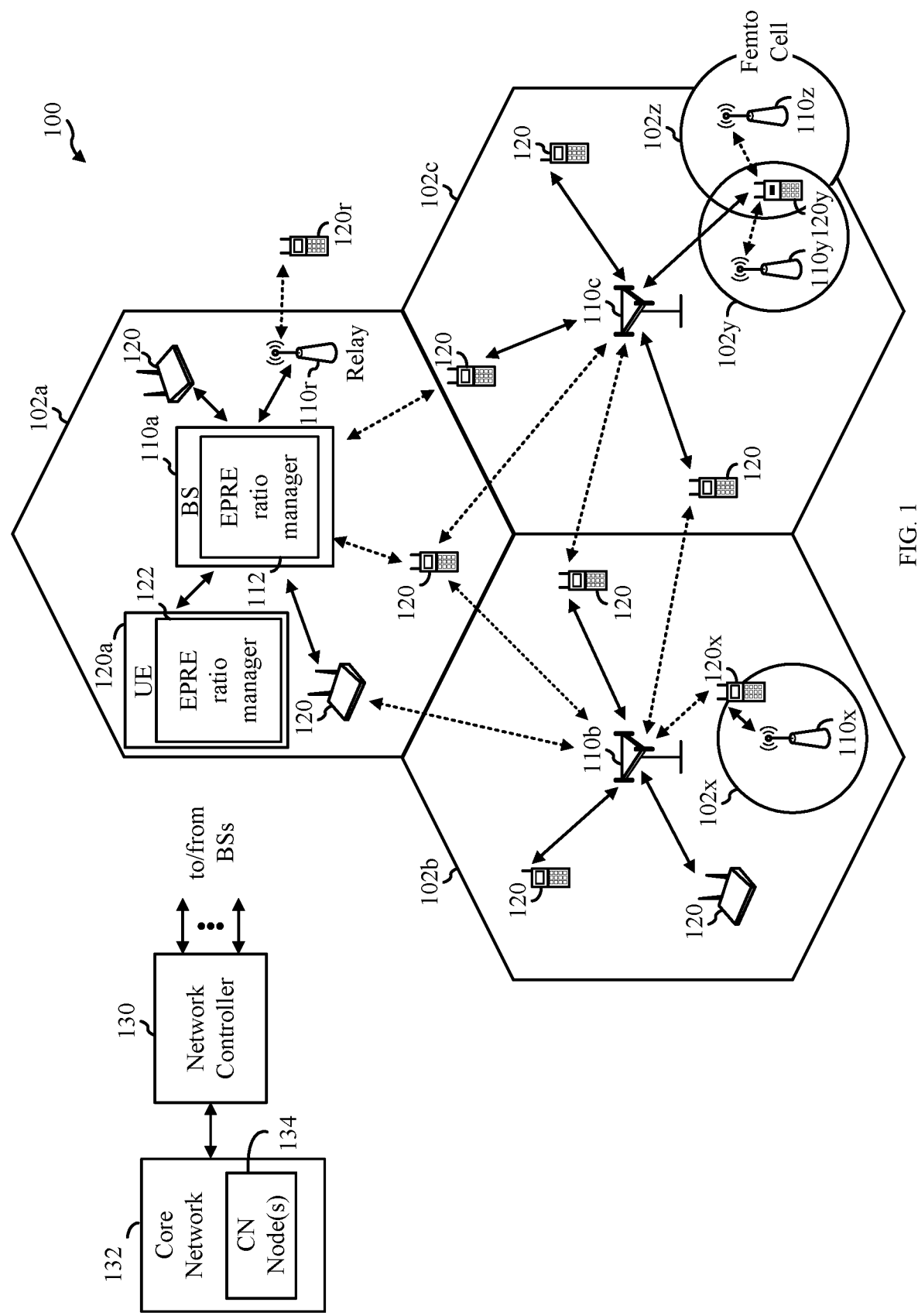
FIG. 1 is a block diagram conceptually illustrating an example telecommunications system, in accordance with certain aspects of the present disclosure.

Aspects of the present disclosure provide apparatus, methods, processing systems, and computer readable mediums for determining an energy per resource element (EPRE) ratio for non-zero power (NZP) channel state information reference signals (CSI-RSs) when a device is measuring a wireless channel. In previously known techniques (e.g., 3GPP Release 15 (Rel-15)), when an NZP CSI-RS resource is configured on a UE for interference measurement, the UE scales the measurement(s) (e.g., reference signal received power (RSRP)) based on an EPRE ratio associated with the NZP CSI-RS resource. For example, for CSI measurement(s), a UE may assume (1) each NZP CSI-RS port configured for interference measurement corresponds to an interference transmission layer, (2) all interference transmission layers on NZP CSI-RS ports for interference measurement take into account associated EPRE ratios, and (3) other interference signals occur on REs of an NZP CSI-RS resource for channel measurement, REs of an NZP CSI-RS resource for interference measurement, or REs of a CSI interference measurement (CSI-IM) resource for interference measurement. However, there may be two EPRE ratios configured per NZP CSI-RS resource, and thus it is desirable to develop techniques to specify which EPRE ratio a UE uses when measuring an NZP CSI-RS resource. The two EPRE ratios for each NZP CSI-RS resource may be referred to as powerControlOffset and powerControlOffsetSS. In some techniques, powerControlOffset is the assumed ratio of physical downlink shared channel (PDSCH) EPRE to NZP CSI-RS EPRE when a UE derives CSI feedback for the NZP CSI-RS resource. In these techniques, powerControlOffset may have values in the range of [−8, 15] dB with 1 dB step size. In some techniques, powerControlOffsetSS is the assumed ratio of NZP CSI-RS EPRE to synchronization signal or physical broadcast channel (SS/PBCH) block EPRE.

The following description provides examples of a device determining an EPRE ratio for NZP CSI-RS resources when a device is measuring a wireless channel in communication systems, and is not limiting of the scope, applicability, or examples set forth in the claims. The following description also provides examples of a device measuring NZP CSI-RS resources when a device is measuring a wireless channel in communication systems without scaling a measured energy based on an EPRE ratio for the NZP CSI-RS resource, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or wider), millimeter wave (mmW) targeting high carrier frequency (e.g., 25 GHz or higher), massive machine type communications (mMTC) targeting non-backward compatible machine type communications (MTC) techniques, and/or mission critical techniques targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for determining an energy per resource element (EPRE) ratio for non-zero power (NZP) channel state information reference signals (CSI-RSs) when a device is measuring a wireless channel. As shown in FIG. 1, the BS 110a includes an EPRE ratio manager 112. The EPRE ratio manager 112 may be configured to determine, based on an indication, an energy per resource element (EPRE) ratio for a non-zero power (NZP) channel state information reference signal (CSI-RS) resource and to receive one or more measurements determined based on the EPRE ratio for the NZP CSI-RS resource and CSI-RSs associated with the NZP CSI-RS resource, in accordance with aspects of the present disclosure. The EPRE ratio manager 112 may also be configured to determine, based on an indication, an energy per resource element (EPRE) ratio for a non-zero power (NZP) channel state information reference signal (CSI-RS) resource; and to receive one or more measurements determined using at least the NZP CSI-RS resource and CSI-RSs associated with the NZP CSI-RS resource without a measured energy being scaled based on the EPRE ratio for the NZP CSI-RS resource. As shown in FIG. 1, the UE 120a includes an EPRE ratio manager 122. The EPRE ratio manager 122 may be configured to determine, based on an indication, an energy per resource element (EPRE) ratio for a non-zero power (NZP) channel state information reference signal (CSI-RS) resource and to measure a channel based on the determined EPRE ratio and CSI-RSs associated with the NZP CSI-RS resource, in accordance with aspects of the present disclosure. The EPRE ratio manager 122 may also be configured to determine, based on an indication, an energy per resource element (EPRE) ratio for a non-zero power (NZP) channel state information reference signal (CSI-RS) resource; and to perform a layer one signal to interference and noise ratio (L1-SINR) measurement without scaling a measured energy based on the EPRE ratio for the NZP CSI-RS resource.

Figure 2:
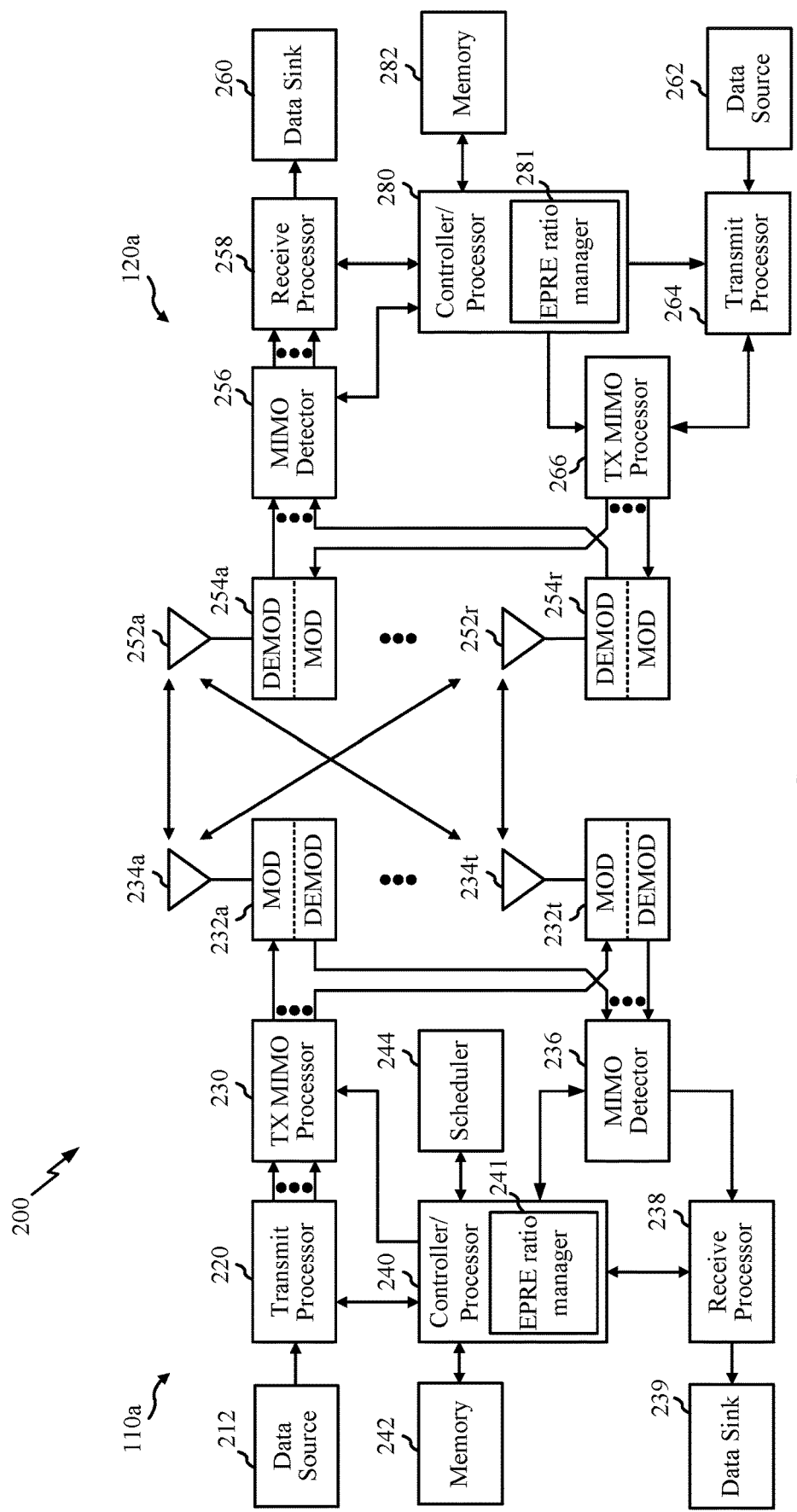
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an EPRE ratio manager 241 that may be configured for determining, based on an indication, an energy per resource element (EPRE) ratio for a non-zero power (NZP) channel state information reference signal (CSI-RS) resource and for receiving one or more measurements determined based on the EPRE ratio for the NZP CSI-RS resource and CSI-RSs associated with the NZP CSI-RS resource, according to aspects described herein. The EPRE ratio manager 241 may also be configured for determining, based on an indication, an energy per resource element (EPRE) ratio for a non-zero power (NZP) channel state information reference signal (CSI-RS) resource; and receiving one or more measurements determined using at least the NZP CSI-RS resource and CSI-RSs associated with the NZP CSI-RS resource without a measured energy being scaled based on the EPRE ratio for the NZP CSI-RS resource. As shown in FIG. 2, the controller/processor 280 of the UE 120a has an EPRE ratio manager 281 that may be configured for determining, based on an indication, an energy per resource element (EPRE) ratio for a non-zero power (NZP) channel state information reference signal (CSI-RS) resource and for measuring a channel based on the determined EPRE ratio and CSI-RSs associated with the NZP CSI-RS resource, according to aspects described herein. The EPRE ratio manager 281 may also be configured for determining, based on an indication, an energy per resource element (EPRE) ratio for a non-zero power (NZP) channel state information reference signal (CSI-RS) resource; and performing a layer one signal to interference and noise ratio (L1-SINR) measurement without scaling a measured energy based on the EPRE ratio for the NZP CSI-RS resource. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
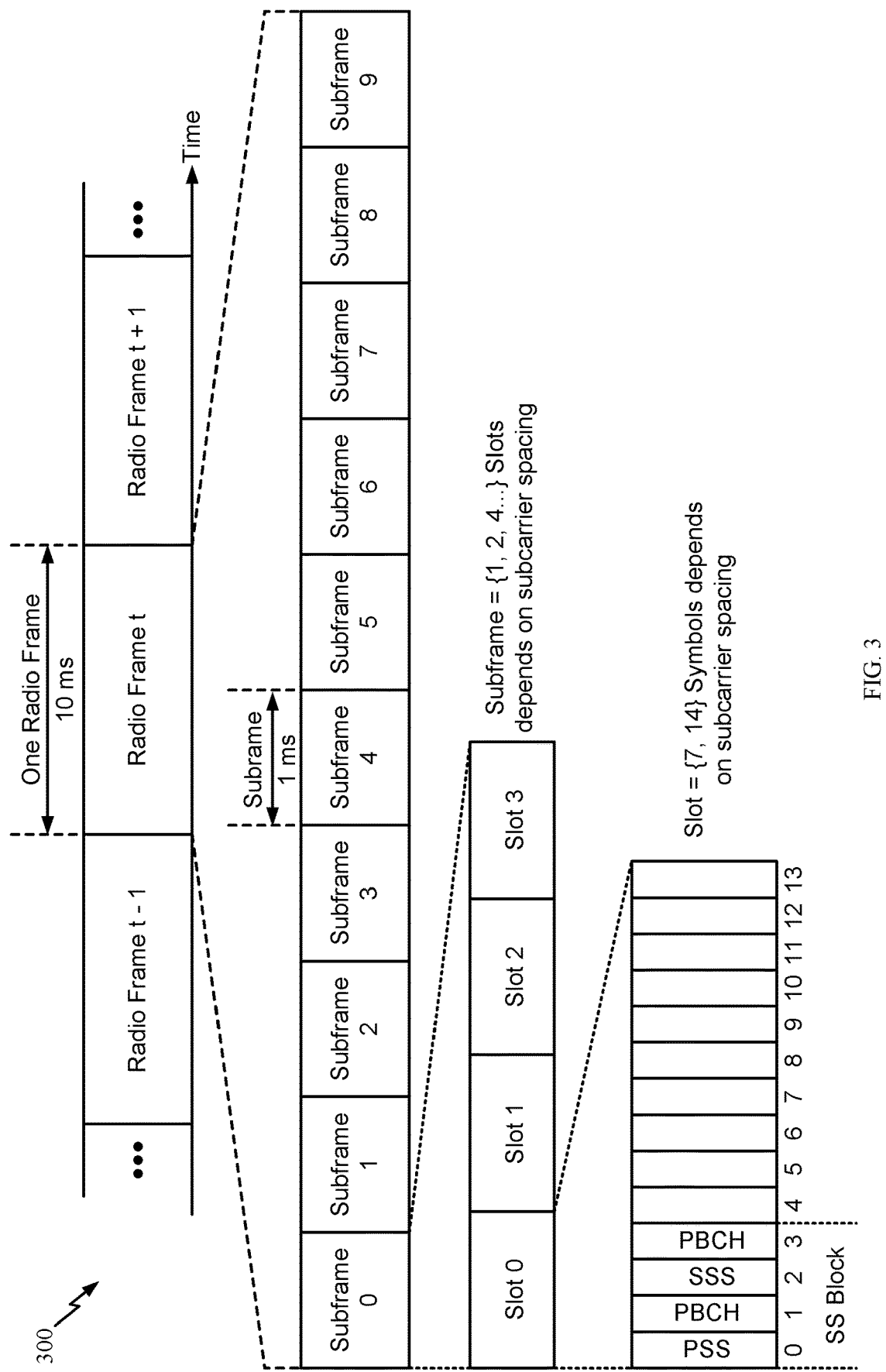
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Energy Per Resource Element Ratio for
Non-Zero Power Channel State Information
Reference Signals Aspects of the present disclosure provide techniques for determining an energy per resource element (EPRE) ratio for non-zero power (NZP) channel state information reference signals (CSI-RSs) when a device is measuring a wireless channel. In previously known techniques (e.g., 3GPP Release 15 (Rel-15)), when an NZP CSI-RS resource is configured on a UE for interference measurement, the UE scales the measurement(s) (e.g., reference signal received power (RSRP)) based on an EPRE ratio associated with the NZP CSI-RS resource. For example, for CSI measurement (s), a UE may assume (1) each NZP CSI-RS port configured for interference measurement corresponds to an interference transmission layer, (2) all interference transmission layers on NZP CSI-RS ports for interference measurement take into account associated EPRE ratios, and (3) other interference signals occur on REs of an NZP CSI-RS resource for channel measurement, REs of an NZP CSI-RS resource for interference measurement, or REs of a CSI interference measurement (CSI-IM) resource for interference measurement. However, there may be two EPRE ratios configured per NZP CSI-RS resource, and thus it is desirable to develop techniques to specify which EPRE ratio a UE uses when measuring an NZP CSI-RS resource. The two EPRE ratios for each NZP CSI-RS resource may be referred to as powerControlOffset and powerControlOffsetSS. In some techniques, powerControlOffset is the assumed ratio of physical downlink shared channel (PDSCH) EPRE to NZP CSI-RS EPRE when a UE derives CSI feedback for the NZP CSI-RS resource. In these techniques, powerControlOffset may have values in the range of [−8, 15] dB with 1 dB step size. In some techniques, powerControlOffsetSS is the assumed ratio of NZP CSI-RS EPRE to synchronization signal or physical broadcast channel (SS/PBCH) block EPRE.

In aspects of the present disclosure, a UE can determine an EPRE ratio to use for an NZP CSI-RS resource and measure a channel based on the determined EPRE ratio and CSI-RSs associated with (e.g., received via resource elements (REs) of) the NZP CSI-RS resource. The UE may determine which EPRE ratio to use when NZP CSI-RS is configured when the NZP CSI-RS is used for a L1-RSRP measurement, when the NZP CSI-RS is used for CSI feedback, including channel quality indicator (CQI), rank indicator (RI), or precoding matrix indicator (PMI), or any metric other than a L1-RSRP or a layer 1 signal-to-interference-and-noise ratio (L1-SINR); or when the NZP CSI-RS is used for a channel measurement resource (CMR), an interference measurement resource (IMR), or for both for an L1-SINR measurement. For each of these cases, a UE may determine whether powerControlOffset or powerControlOffsetSS should be used as the EPRE ratio to scale the RSRP or other measurement measured on the NZP CSI-RS. The UE may make the determination of the EPRE ratio based on a rule(s) in a communications standards or based on an indication from a base station (e.g., a next generation NodeB (gNB)) received, e.g., via radio resource control (RRC) signaling, via a medium access control control element (MAC-CE), or via downlink control information (DCI).

Figure 4:
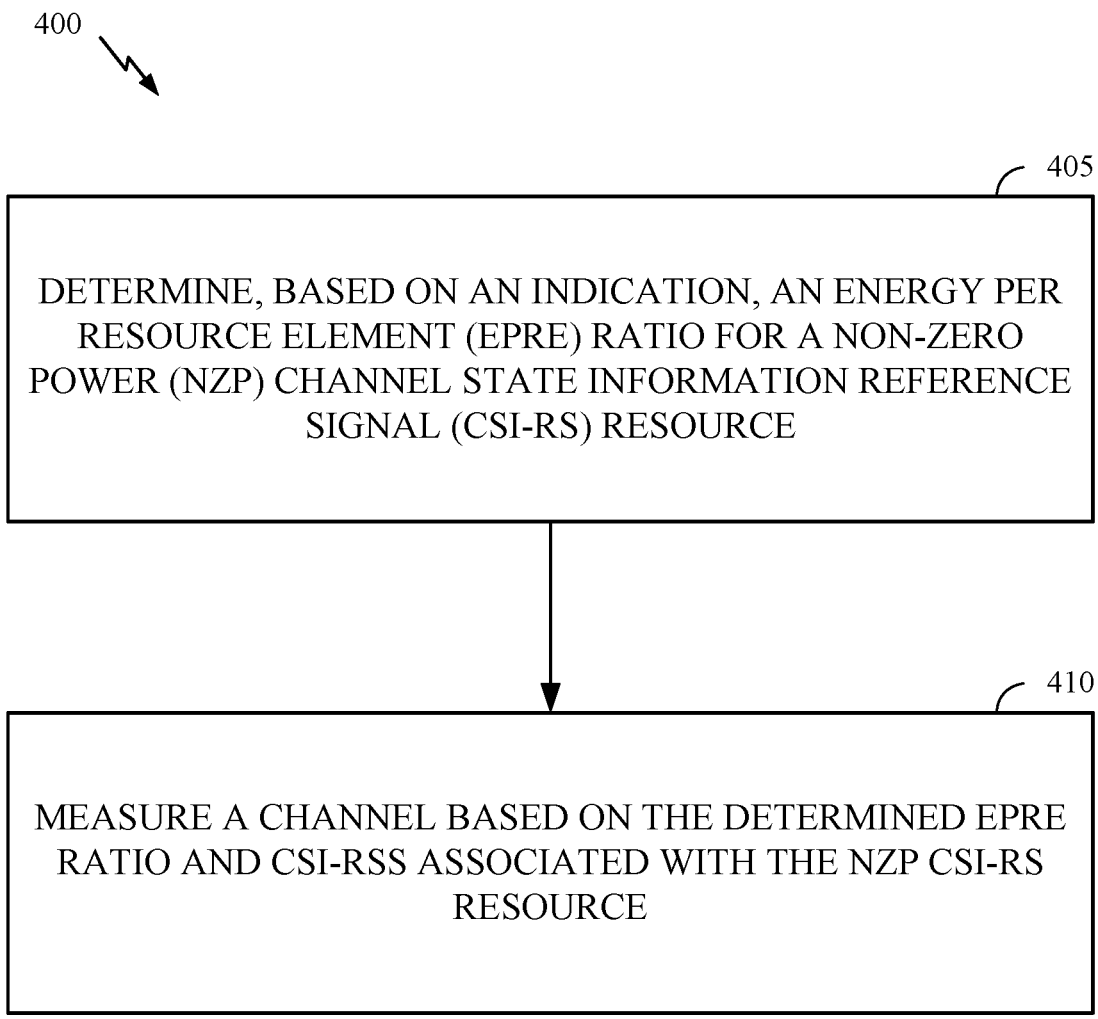
FIG. 4 is a flow diagram illustrating example operations by a UE for determining an energy per resource element (EPRE) ratio for non-zero power (NZP) channel state information reference signals (CSI-RSs) when measuring a wireless channel, in accordance with certain aspects of the present disclosure.

FIG. 4 is a flow diagram illustrating example operations 400 for determining an energy per resource element (EPRE) ratio for non-zero power (NZP) channel state information reference signals (CSI-RSs) when measuring a wireless channel, in accordance with certain aspects of the present disclosure. The operations 400 may be performed, for example, by a UE (e.g., such as a UE 120a in the wireless communication network 100). The operations 400 may be complementary operations by the UE to the operations 500 performed by the BS. Operations 400 may be implemented as software components that are executed and run on one or more processors (e.g., controller/processor 280 of FIG. 2). Further, the transmission and reception of signals by the UE in operations 400 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 400 may begin, at block 405, by determining, based on an indication, an energy per resource element (EPRE) ratio for a non-zero power (NZP) channel state information reference signal (CSI-RS) resource.

Operations 400 may continue, at block 410, by measuring a channel based on the determined EPRE ratio and CSI-RSs associated with the NZP CSI-RS resource.

According to aspects of the present disclosure, the indication of block 405 may indicate an EPRE ratio when the NZP CSI-RS resource is for a layer one (L1) reference signal received power (RSRP) measurement, wherein measuring the channel as in block 410 may include measuring L1-RSRP for the channel.

In aspects of the present disclosure, the indication of block 405 may indicate an EPRE ratio when the NZP CSI-RS resource is for determining channel state information (CSI) feedback, wherein measuring the channel as in block 410 may include measuring CSI for the channel.

According to aspects of the present disclosure, the indication of block 405 may indicate an EPRE ratio when the NZP CSI-RS resource is for use as a channel measurement resource (CMR), an interference measurement resource (IMR), or for a layer one (L1) signal-to-interference-and-noise ratio (SINR) measurement.

In aspects of the present disclosure, a UE performing operations 400 may receive the indication of block 405 via a radio resource control (RRC) message.

According to aspects of the present disclosure, a UE performing operations 400 may receive the indication of block 405 in a medium access control (MAC) control element (CE).

In aspects of the present disclosure, a UE performing operations 400 may receive the indication of block 405 in downlink control information (DCI).

According to aspects of the present disclosure, the indication of block 405 may include transmission of a synchronization signal block (SSB) during a period of the NZP CSI-RS resource.

In aspects of the present disclosure, the indication of block 405 may indicate the determined EPRE ratio includes a powerControlOffset.

According to aspects of the present disclosure, the indication of block 405 may indicate the determined EPRE ratio includes a powerControlOffsetSS.

In aspects of the present disclosure, the indication of block 405 may include a rule in a wireless communications standard.

According to aspects of the present disclosure, a device performing operations 400 may measure RSRP for the NZP CSI-RS resource and use the measured RSRP on the NZP CSI-RS resource as a layer one reference signal received power (L1-RSRP) without the RSRP being scaled based on the EPRE ratio for the NZP CSI-RS resource.

In aspects of the present disclosure, a device performing operations 400 may determine a numerator of a layer one signal to interference and noise ratio (L1-SINR) for the channel as a signal power measured on a channel measurement resource (CMR) associated with the NZP CSI-RS resource without the signal power being scaled based on the EPRE ratio for the NZP CSI-RS resource and determine a denominator of the L1-SINR as a total received power on an interference measurement resource (IMR) associated with the NZP CSI-RS resource without the total received power being scaled based on the EPRE ratio for the NZP CSI-RS resource.

Figure 5:
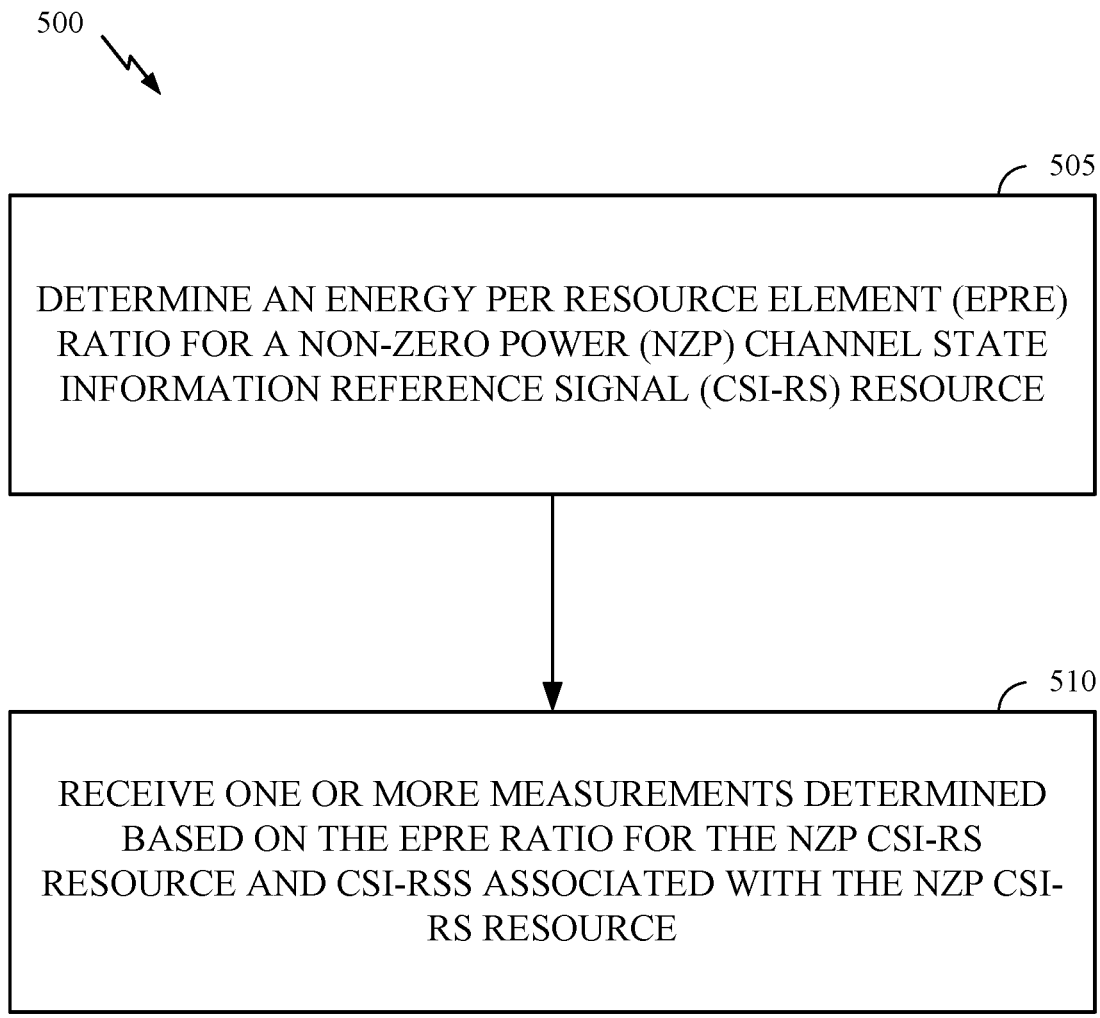
FIG. 5 is a flow diagram illustrating example operations by a BS for receiving measurements of NZP CSI-RS without a measured energy being scaled based on an EPRE ratio for the NZP CSI-RS resource, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., a gNB or the BS 110a in the wireless communication network 100). The operations 500 may be complementary operations by the BS to the operations 400 performed by the UE. Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, by determining an energy per resource element (EPRE) ratio for a non-zero power (NZP) channel state information reference signal (CSI-RS) resource.

Operations 500 may continue, at block 510, by receiving one or more measurements determined based on the EPRE ratio for the NZP CSI-RS resource and CSI-RSs associated with the NZP CSI-RS resource.

According to aspects of the present disclosure, the determination of block 505 may be based on the NZP CSI-RS resource being for a layer one (L1) reference signal received power (RSRP) measurement, and the measurements of block 510 may include the L1 RSRP measurement.

In aspects of the present disclosure, the determination of block 505 may be based on the NZP CSI-RS resource being for determining channel state information (CSI) feedback, and the measurements of block 510 may include the CSI feedback.

According to aspects of the present disclosure, the determination of block 505 may be based on the NZP CSI-RS resource being for use as a channel measurement resource (CMR), as an interference measurement resource (IMR), or as a layer one (L1) signal-to-interference-and-noise ratio (SINR) measurement.

In aspects of the present disclosure, a BS performing operations 500 may transmit an indication of the determined EPRE ratio of block 505 via a radio resource control (RRC) message.

According to aspects of the present disclosure, a BS performing operations 500 may transmit an indication of the determined EPRE ratio of block 505 in a medium access control (MAC) control element (CE).

In aspects of the present disclosure, a BS performing operations 500 may transmit an indication of the determined EPRE ratio of block 505 in a downlink control information (DCI).

According to aspects of the present disclosure, the determination of block 505 may be based on transmission of a synchronization signal block (SSB) during a period of the NZP CSI-RS resource.

In aspects of the present disclosure, a BS performing operations 500 may schedule a transmission based on the one or more measurements and the determined EPRE.

According to aspects of the present disclosure, a BS performing operations 500 may configure the NZP CSI-RS resource for a device, wherein the one or more measurements of block 510 are received from the device.

In aspects of the present disclosure, the determined EPRE ratio of block 505 may include a powerControlOffset.

According to aspects of the present disclosure, the determined EPRE ratio of block 505 may include a powerControlOffsetSS.

In aspects of the present disclosure, the determination of block 505 may be based on a rule in a wireless communications standard.

Figure 6:
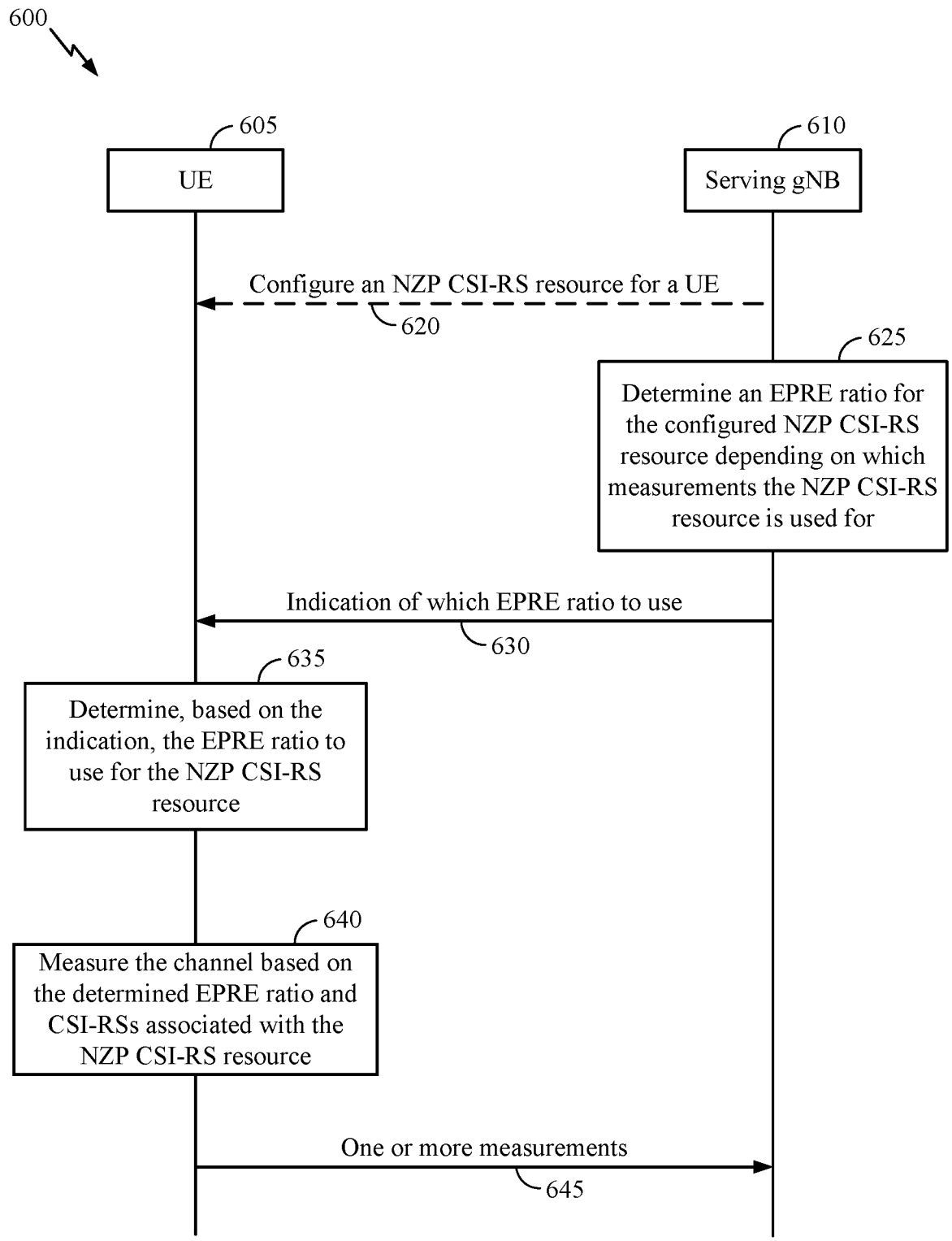
FIG. 6 is a call flow diagram illustrating example signaling for determining an EPRE ratio for NZP CSI-RSs when a device is measuring a wireless channel, in accordance with aspects of the present disclosure.

FIG. 6 illustrates an exemplary call flow 600 between a UE 605 (e.g., UE 120a, shown in FIGS. 1 & 2) and a serving gNB (e.g., BS 110a, shown in FIGS. 1 & 2). The call flow begins at 620 with the gNB optionally configuring an NZP CSI-RS resource for the UE. At 625, the gNB determines an EPRE ratio for the configured NZP CSI-RS resource, depending on which measurements the NZP CSI-RS resource is used for. At 630, the gNB transmits an indication of which EPRE ratio to use for measuring the NZP CSI-RS resource. At 635, the UE determines, based on the indication, the EPRE ratio to use for the NZP CSI-RS resource. At 640, the UE measures the channel based on the determined EPRE ratio and CSI-RSs associated with the NZP CSI-RS resource. At 645, the UE transmits and the gNB receives one or more measurements determined based on the determined EPRE ratio and CSI-RSs associated with the NZP CSI-RS resource.

Figure 7:
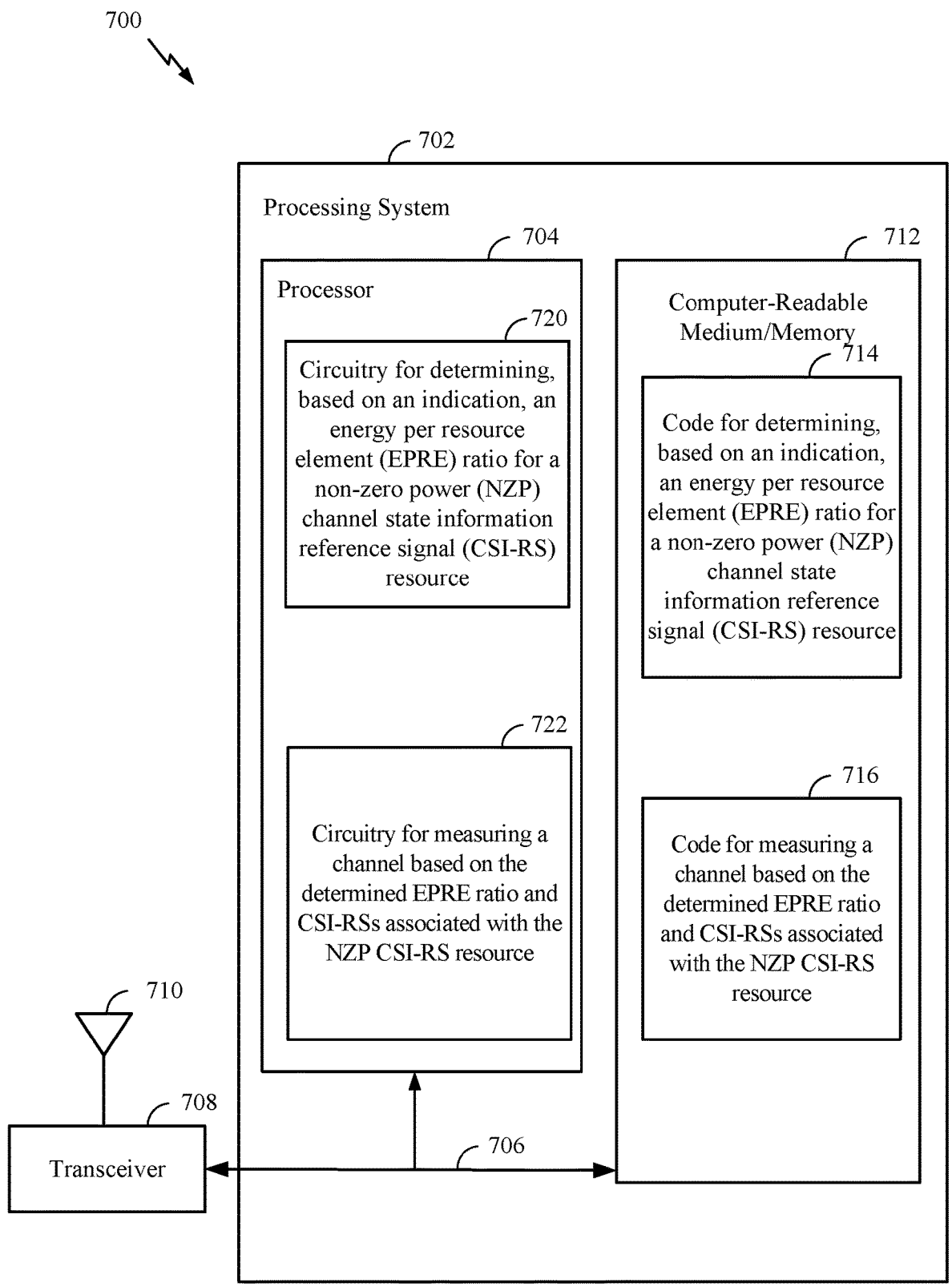
FIG. 7 illustrates a communications device that may include various components configured to perform the operations illustrated in FIG. 4, in accordance with aspects of the present disclosure.

FIG. 7 illustrates a communications device 700 that may include various components (e.g., corresponding to means-plus-function components) configured to perform operations for the techniques disclosed herein, such as the operations illustrated in FIG. 4. The communications device 700 includes a processing system 702 coupled to a transceiver 708 (e.g., a transmitter and/or a receiver). The transceiver 708 is configured to transmit and receive signals for the communications device 700 via an antenna 710, such as the various signals as described herein. The processing system 702 may be configured to perform processing functions for the communications device 700, including processing signals received and/or to be transmitted by the communications device 700.

The processing system 702 includes a processor 704 coupled to a computer-readable medium/memory 712 via a bus 706. In certain aspects, the computer-readable medium/memory 712 is configured to store instructions (e.g., computer-executable code) that when executed by the processor 704, cause the processor 704 to perform the operations illustrated in FIG. 4, or other operations for performing the various techniques discussed herein for determining an energy per resource element (EPRE) ratio for non-zero power (NZP) channel state information reference signals (CSI-RSs) when a device is measuring a wireless channel. In certain aspects, computer-readable medium/memory 712 stores code 714 for determining, based on an indication, an energy per resource element (EPRE) ratio for a non-zero power (NZP) channel state information reference signal (CSI-RS) resource; and code 716 for measuring a channel based on the determined EPRE ratio and CSI-RSs associated with the NZP CSI-RS resource. In certain aspects, the processor 704 has circuitry configured to implement the code stored in the computer-readable medium/memory 712. The processor 704 includes circuitry 720 for determining, based on an indication, an energy per resource element (EPRE) ratio for a non-zero power (NZP) channel state information reference signal (CSI-RS) resource; and circuitry 722 for measuring a channel based on the determined EPRE ratio and CSI-RSs associated with the NZP CSI-RS resource.

Figure 8:
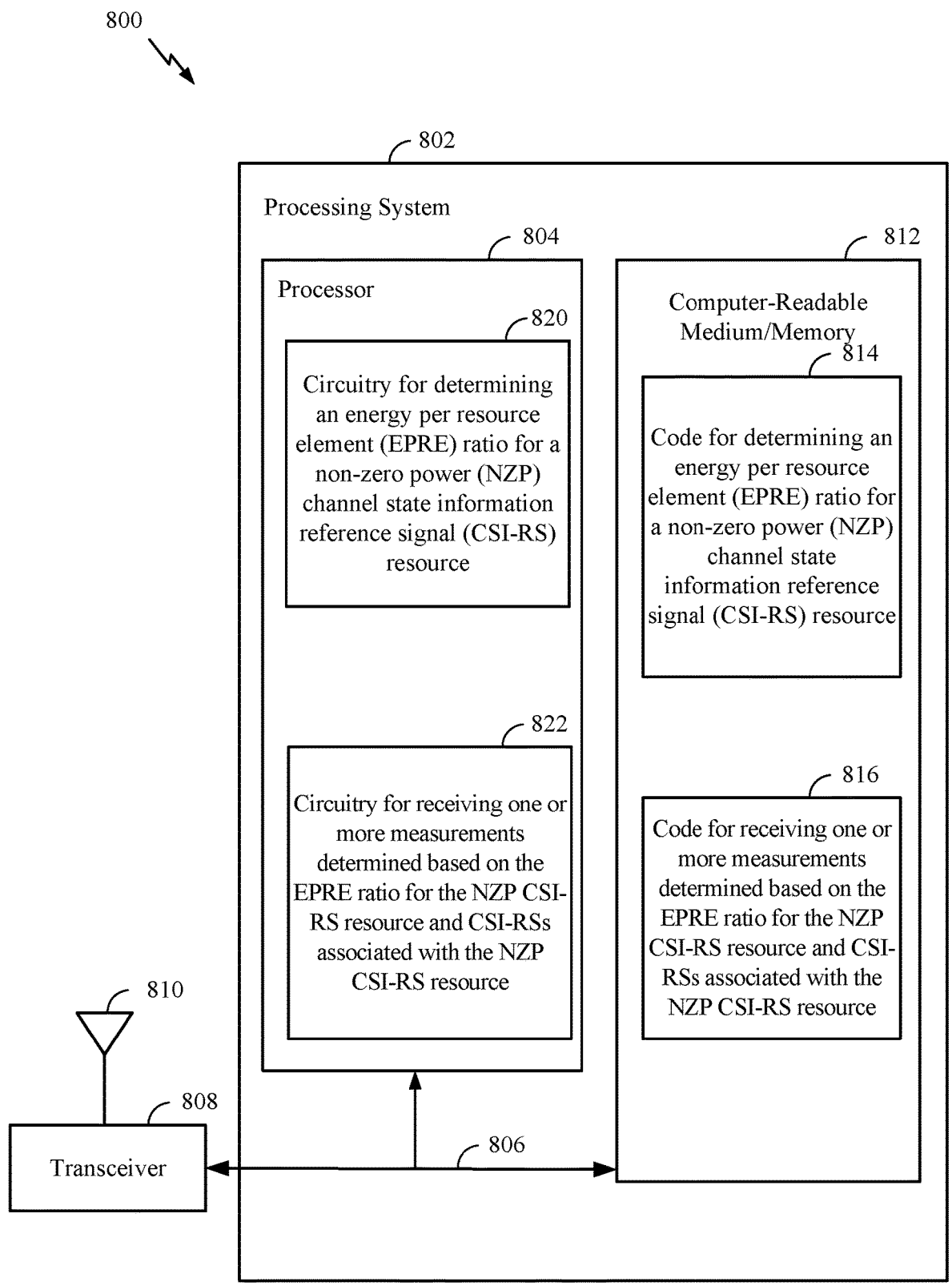
FIG. 8 illustrates a communications device that may include various components configured to perform the operations illustrated in FIG. 5, in accordance with aspects of the present disclosure.

FIG. 8 illustrates a communications device 800 that may include various components (e.g., corresponding to means-plus-function components) configured to perform operations for the techniques disclosed herein, such as the operations illustrated in FIG. 5. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIG. 5, or other operations for performing the various techniques discussed herein for determining an energy per resource element (EPRE) ratio for non-zero power (NZP) channel state information reference signals (CSI-RSs) when a device is measuring a wireless channel. In certain aspects, computer-readable medium/memory 812 stores code 814 for determining an energy per resource element (EPRE) ratio for a non-zero power (NZP) channel state information reference signal (CSI-RS) resource; and code 816 for receiving one or more measurements determined based on the EPRE ratio for the NZP CSI-RS resource and CSI-RSs associated with the NZP CSI-RS resource. In certain aspects, the processor 804 has circuitry configured to implement the code stored in the computer-readable medium/memory 812. The processor 804 includes circuitry 820 for determining an energy per resource element (EPRE) ratio for a non-zero power (NZP) channel state information reference signal (CSI-RS) resource; and circuitry 822 for receiving one or more measurements determined based on the EPRE ratio for the NZP CSI-RS resource and CSI-RSs associated with the NZP CSI-RS resource.

According to aspects of the present disclosure, when an NZP CSI-RS resource is used (e.g., by a UE) in L1-SINR measurement as a CMR and/or as an IMR, the configured EPRE ratio parameters associated with the NZP CSI-RS resource may not be used by the UE. Similarly, when an NZP CSI-RS resource is used (e.g., by a UE) in L1-RSRP measurement, the configured EPRE ratio parameters associated with the NZP CSI-RS resource may not be used by the UE. For L1-RSRP measurement, the total measured RSRP on an NZP CSI-RS resource may be reported as the L1-RSRP without being scaled based on an EPRE ratio of the NZP CSI-RS resource. For L1-SINR measurement, the numerator of the reported L1-SINR may be the signal power measured on the CMR without being scaled based on an EPRE ratio of the NZP CSI-RS resource. Also, the denominator (i.e., measure of interference and noise) of the reported L1-SINR may be the total received power measured on the associated IMR without being scaled based on an EPRE ratio of the NZP CSI-RS resource. The EPRE ratio parameters may include powerControlOffset and powerControlOffsetSS.

In aspects of the present disclosure, for CSI measurement(s) other than L1-SINR, a UE may assume: (1) each NZP CSI-RS port configured for interference measurement corresponds to an interference transmission layer; (2) all interference transmission layers on NZP CSI-RS ports for interference measurement take into account an associated EPRE ratio; (3) other interference signals on REs of NZP CSI-RS resource for channel measurement, NZP CSI-RS resource for interference measurement, or CSI-IM resource for interference measurement.

According to aspects of the present disclosure; for L1-SINR measurement(s) with one resource setting, a UE may assume the only other interference signal(s) are on REs of the NZP CSI-RS resource for channel measurement; and for L1-SINR measurement(s) with more than one resource setting, a UE may assume that other interference signal(s) are on REs of the NZP CSI-RS resource for interference measurement or a CSI-IM resource for interference measurement.

Figure 9:
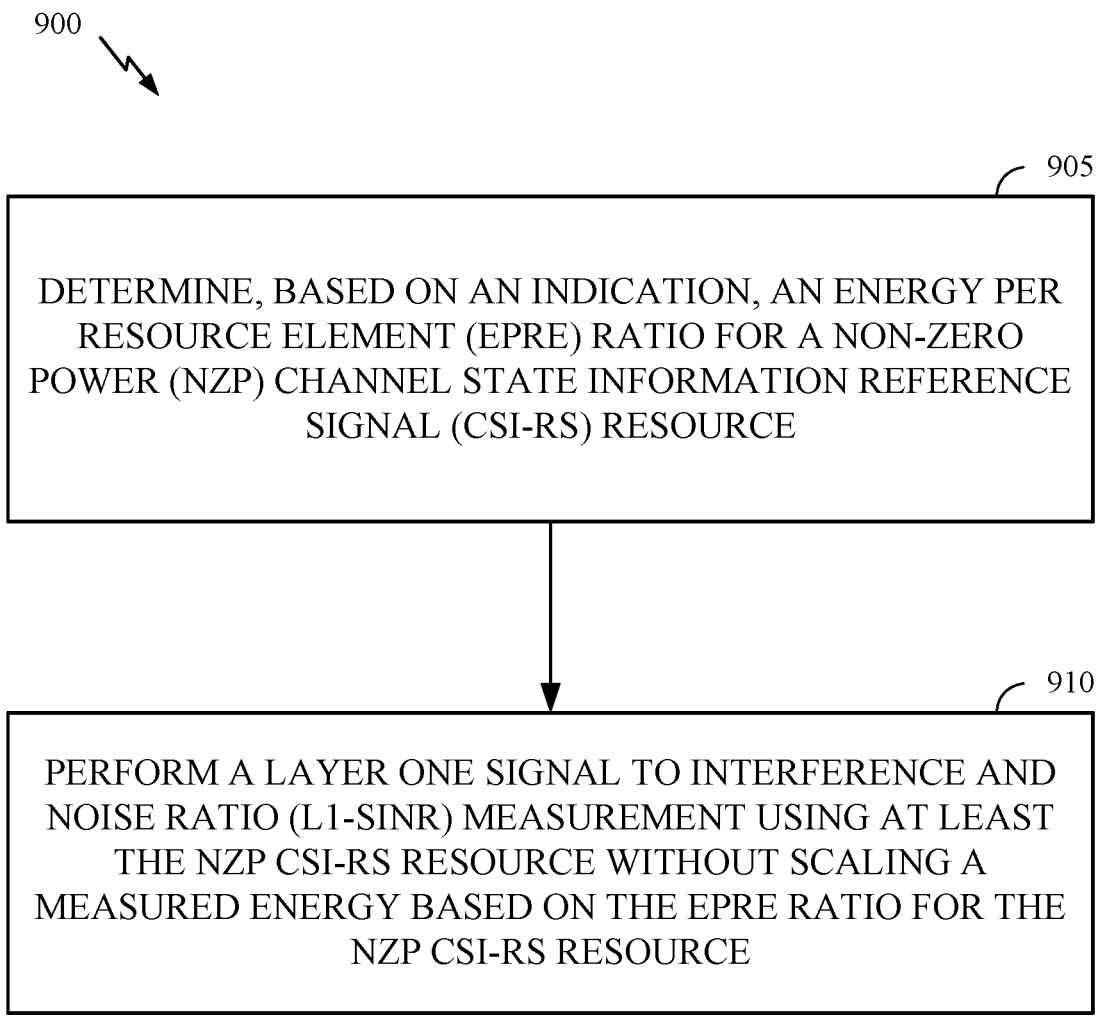
FIG. 9 is a flow diagram illustrating example operations by a UE for measuring NZP CSI-RS without scaling a measured energy based on an EPRE ratio for the NZP CSI-RS resource, in accordance with certain aspects of the present disclosure.

FIG. 9 is a flow diagram illustrating example operations 900 for measuring NZP CSI-RS without scaling a measured energy based on an EPRE ratio for the NZP CSI-RS resource, in accordance with certain aspects of the present disclosure. The operations 900 may be performed, for example, by a UE (e.g., such as a UE 120a in the wireless communication network 100). The operations 900 may be complementary operations by the UE to the operations 1000 performed by the BS. Operations 900 may be implemented as software components that are executed and run on one or more processors (e.g., controller/processor 280 of FIG. 2). Further, the transmission and reception of signals by the UE in operations 900 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 900 may begin, at block 905, by determining, based on an indication, an energy per resource element (EPRE) ratio for a non-zero power (NZP) channel state information reference signal (CSI-RS) resource.

Operations 900 may continue, at block 910, by performing a layer one signal to interference and noise ratio (L1-SINR) measurement using at least the NZP CSI-RS resource without scaling a measured energy based on the EPRE ratio for the NZP CSI-RS resource.

Figure 10:
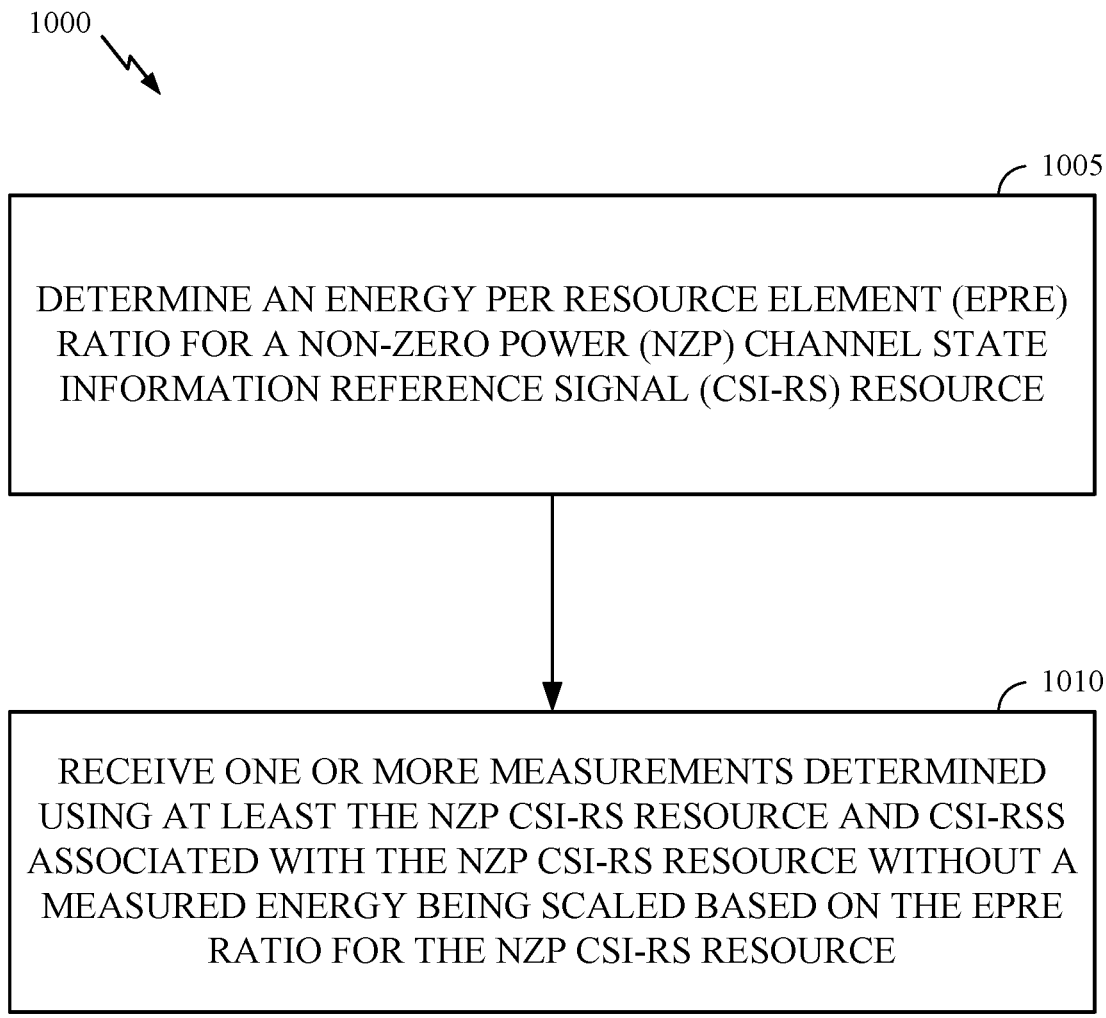
FIG. 10 is a flow diagram illustrating example operations by a BS for receiving measurements of NZP CSI-RS without a measured energy being scaled based on an EPRE ratio for the NZP CSI-RS resource, in accordance with certain aspects of the present disclosure.

FIG. 10 is a flow diagram illustrating example operations 1000 for receiving measurements of NZP CSI-RS without a measured energy being scaled based on an EPRE ratio for the NZP CSI-RS resource, in accordance with certain aspects of the present disclosure. The operations 1000 may be performed, for example, by a BS (e.g., a gNB or the BS 110a in the wireless communication network 100). The operations 1000 may be complementary operations by the BS to the operations 900 performed by the UE. Operations 1000 may be implemented as software components that are executed and run on one or more processors (e.g., controller/processor 240 of FIG. 2). Further, the transmission and reception of signals by the BS in operations 1000 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 1000 may begin, at block 1005, by determining an energy per resource element (EPRE) ratio for a non-zero power (NZP) channel state information reference signal (CSI-RS) resource.

Operations 1000 may continue, at block 1010, by receiving one or more measurements determined using at least the NZP CSI-RS resource and CSI-RSs associated with the NZP CSI-RS resource without a measured energy being scaled based on the EPRE ratio for the NZP CSI-RS resource.

Figure 11:
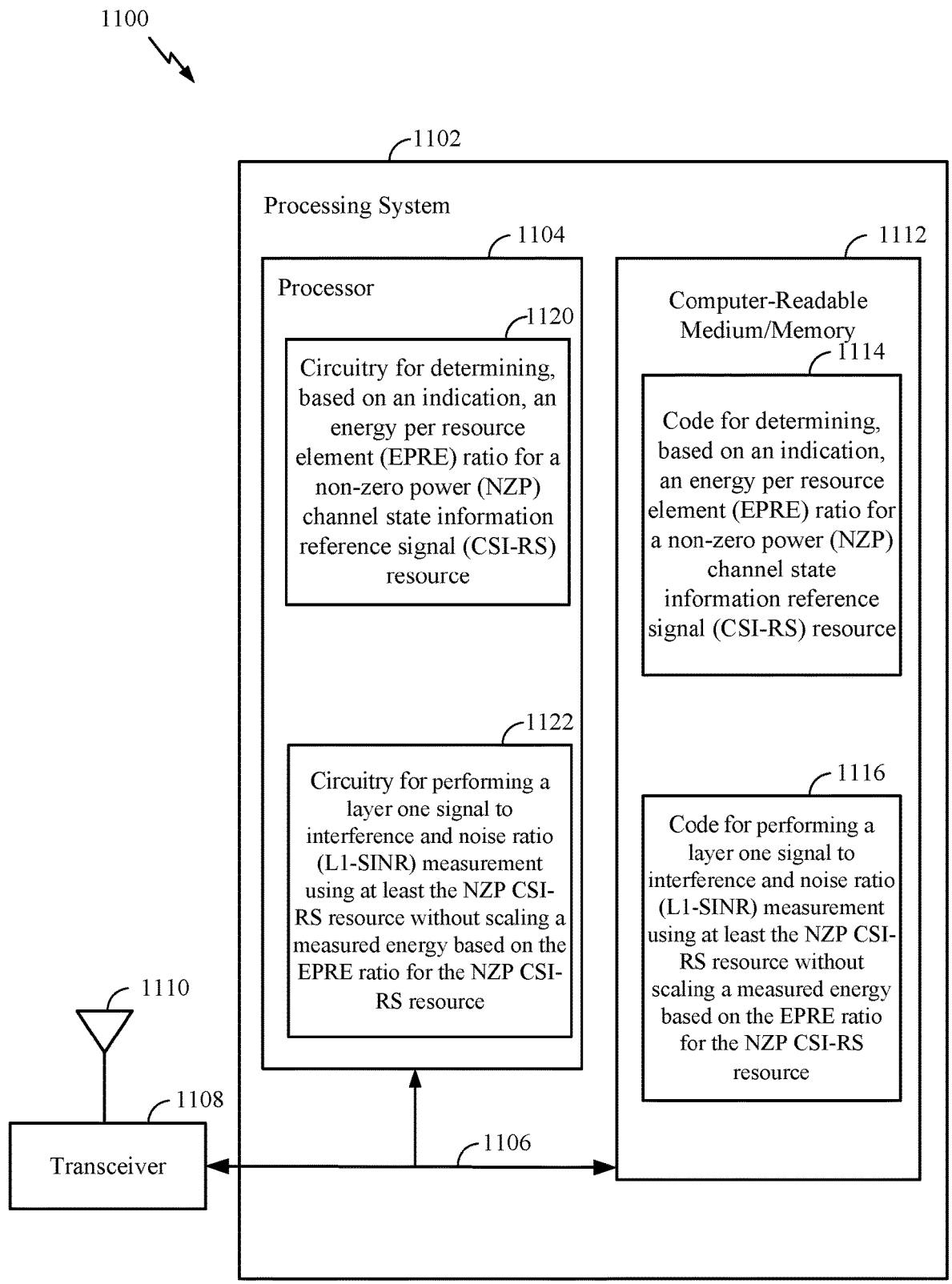
FIG. 11 illustrates a communications device that may include various components configured to perform the operations illustrated in FIG. 9, in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 9. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 9, or other operations for performing the various techniques discussed herein for measuring NZP CSI-RS without scaling a measured energy based on an EPRE ratio for the NZP CSI-RS resource. In certain aspects, computer-readable medium/memory 1112 stores code 1114 for determining, based on an indication, an energy per resource element (EPRE) ratio for a non-zero power (NZP) channel state information reference signal (CSI-RS) resource; and code 1116 for performing a layer one signal to interference and noise ratio (L1-SINR) measurement using at least the NZP CSI-RS resource without scaling a measured energy based on the EPRE ratio for the NZP CSI-RS resource. In certain aspects, the processor 1104 has circuitry configured to implement the code stored in the computer-readable medium/memory 1112. The processor 1104 includes circuitry 1120 for determining, based on an indication, an energy per resource element (EPRE) ratio for a non-zero power (NZP) channel state information reference signal (CSI-RS) resource; and circuitry 1122 for performing a layer one signal to interference and noise ratio (L1-SINR) measurement using at least the NZP CSI-RS resource without scaling a measured energy based on the EPRE ratio for the NZP CSI-RS resource.

Figure 12:
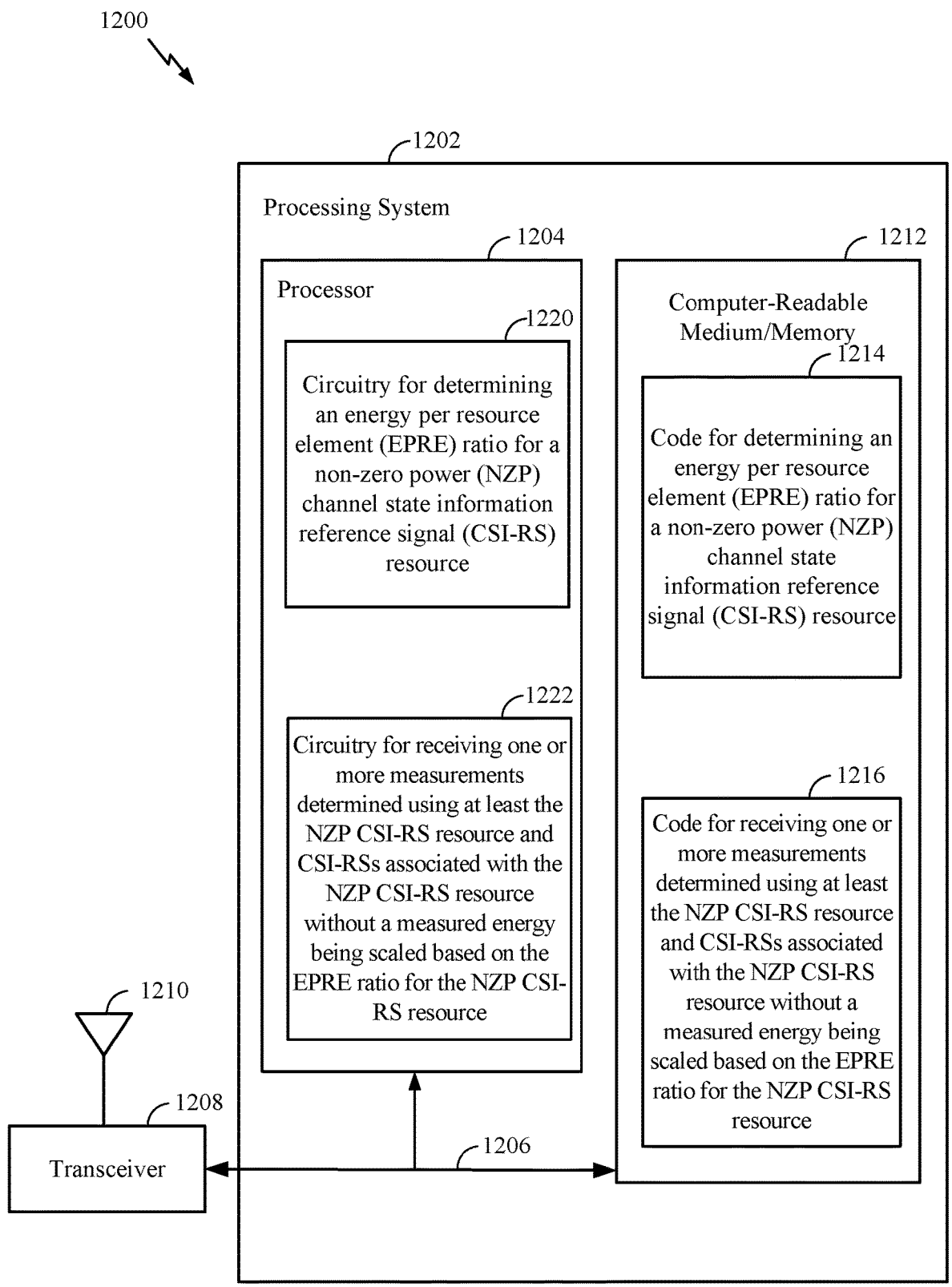
FIG. 12 illustrates a communications device that may include various components configured to perform the operations illustrated in FIG. 10, in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10, or other operations for receiving measurements of NZP CSI-RS without a measured energy being scaled based on an EPRE ratio for the NZP CSI-RS resource. In certain aspects, computer-readable medium/ memory 1212 stores code 1214 for determining an energy per resource element (EPRE) ratio for a non-zero power (NZP) channel state information reference signal (CSI-RS) resource; and code 1216 for receiving one or more measurements determined using at least the NZP CSI-RS resource and CSI-RSs associated with the NZP CSI-RS resource without a measured energy being scaled based on the EPRE ratio for the NZP CSI-RS resource. In certain aspects, the processor 1204 has circuitry configured to implement the code stored in the computer-readable medium/memory 1212. The processor 1204 includes circuitry 1220 for determining an energy per resource element (EPRE) ratio for a non-zero power (NZP) channel state information reference signal (CSI-RS) resource; and circuitry 1222 for receiving one or more measurements determined using at least the NZP CSI-RS resource and CSI-RSs associated with the NZP CSI-RS resource without a measured energy being scaled based on the EPRE ratio for the NZP CSI-RS resource.

Example Aspects of Energy Per Resource Element Ratio for Non-Zero Power Channel State Information Reference Signals In a first aspect, a method for wireless communications performed by a device in a vehicle, includes: determining, based on an indication, an energy per resource element (EPRE) ratio for a non-zero power (NZP) channel state information reference signal (CSI-RS) resource; and measuring a channel based on the determined EPRE ratio and CSI-RSs associated with the NZP CSI-RS resource.

In a second aspect, in combination with the first aspect, the indication indicates an EPRE ratio when the NZP CSI-RS resource is for a layer one (L1) reference signal received power (RSRP) measurement, and measuring the channel comprises measuring L1-RSRP for the channel.

In a third aspect, in combination with any of the first and second aspects, the indication indicates an EPRE ratio when the NZP CSI-RS resource is for determining channel state information (CSI) feedback and wherein measuring the channel comprises measuring CSI for the channel.

In a fourth aspect, in combination with any of the first through third aspects, the indication indicates an EPRE ratio when the NZP CSI-RS resource is for use as at least one of: a channel measurement resource (CMR), an interference measurement resource (IMR), or a layer one (L1) signal-to-interference-and-noise ratio (SINR) measurement.

In a fifth aspect, in combination with any of the first through fourth aspects, the method includes: receiving the indication via a radio resource control (RRC) message.

In a sixth aspect, in combination with any of the first through fourth aspects, the method includes: receiving the indication in a medium access control (MAC) control element (CE).

In a seventh aspect, in combination with any of the first through fourth aspects, the method includes: receiving the indication in downlink control information (DCI).

In an eighth aspect, in combination with any of the first through seventh aspects, the determined EPRE ratio comprises a powerControlOffset.

In a ninth aspect, in combination with one or more of the first through eighth aspects, the determined EPRE ratio comprises a powerControlOffsetSS.

In a tenth aspect, in combination with any of the first through ninth aspects, the indication comprises a rule in a wireless communications standard.

In an eleventh aspect, in combination with any of the first through tenth aspects, the method includes: measuring reference signal received power (RSRP) for the NZP CSI-RS resource; and using the measured RSRP for the NZP CSI-RS resource as a layer one reference signal received power (L1-RSRP) without the RSRP being scaled based on the EPRE ratio for the NZP CSI-RS resource.

In a twelfth aspect, in combination with any of the first through eleventh aspects, the method includes: determining a numerator of a layer one signal to interference and noise ratio (L1-SINR) for the channel as a signal power measured on a channel measurement resource (CMR) associated with the NZP CSI-RS resource without the signal power being scaled based on the EPRE ratio for the NZP CSI-RS resource; and determining a denominator of the L1-SINR as a total received power on an interference measurement resource (IMR) associated with the NZP CSI-RS resource without the total received power being scaled based on the EPRE ratio for the NZP CSI-RS resource.

In a thirteenth aspect, a method for wireless communication performed by a base station (BS) includes: determining an energy per resource element (EPRE) ratio for a non-zero power (NZP) channel state information reference signal (CSI-RS) resource; and receiving one or more measurements determined based on the EPRE ratio for the NZP CSI-RS resource and CSI-RSs associated with the NZP CSI-RS resource.

In a fourteenth aspect, in combination with the thirteenth aspect, the determination is based on the NZP CSI-RS resource being for a layer one (L1) reference signal received power (RSRP) measurement and wherein the measurements comprise the L1 RSRP measurement.

In a fifteenth aspect, in combination with the thirteenth aspect, the determination is based on the NZP CSI-RS resource being for determining channel state information (CSI) feedback and wherein the measurements comprise the CSI feedback.

In a sixteenth aspect, in combination with the thirteenth aspect, the determination is based on the NZP CSI-RS resource being for use as at least one of: a channel measurement resource (CMR), an interference measurement resource (IMR), or a layer one (L1) signal-to-interference-and-noise ratio (SINR) measurement.

In a seventeenth aspect, in combination with any of the thirteenth through sixteenth aspects, the method includes: transmitting an indication of the determined EPRE ratio via a radio resource control (RRC) message.

In an eighteenth aspect, in combination with any of the thirteenth through sixteenth aspects, the method includes transmitting an indication of the determined EPRE ratio in a medium access control (MAC) control element (CE).

In a nineteenth aspect, in combination with any of the thirteenth through sixteenth aspects, the method includes transmitting an indication of the determined EPRE ratio in downlink control information (DCI).

In a twentieth aspect, in combination with any of the thirteenth through nineteenth aspects, the method includes scheduling a transmission based on the one or more measurements and the determined EPRE ratio.

In a twenty-first aspect, in combination with any of the thirteenth through twentieth aspects, the method includes configuring the NZP CSI-RS resource for a device, wherein the one or more measurements are received from the device.

In a twenty-second aspect, in combination with any of the thirteenth through twenty-first aspects, the determined EPRE ratio comprises a powerControlOffset.

In a twenty-third aspect, in combination with any of the thirteenth through twenty-first aspects, the determined EPRE ratio comprises a powerControlOffsetSS.

In a twenty-fourth aspect, in combination with any of the thirteenth through twenty-third aspects, the determination is based on a rule in a wireless communications standard.

In a twenty-fifth aspect, a method for wireless communications performed by a user equipment (UE), includes: determining, based on an indication, an energy per resource element (EPRE) ratio for a non-zero power (NZP) channel state information reference signal (CSI-RS) resource; and performing a layer one signal to interference and noise ratio (L1-SINR) measurement using at least the NZP CSI-RS resource without scaling a measured energy based on the EPRE ratio for the NZP CSI-RS resource.

In a twenty-sixth aspect, in combination with the twenty-fifth aspect, the EPRE ratio for the NZP CSI-RS resource comprises a powerControlOffsetSS.

In a twenty-seventh aspect, in combination with the twenty-fifth aspect, the EPRE ratio for the NZP CSI-RS resource comprises a powerControlOffset.

In a twenty-eighth aspect, an apparatus for wireless communications includes a memory; and a processor coupled to the memory and configured to perform the method of any of aspects 1-27.

In a twenty-ninth aspects, an apparatus for wireless communications includes means for performing the method of any of aspects 1-27.

In a thirtieth aspect, a computer readable medium stores computer executable code thereon for performing the method of any of aspects 1-27.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 4, FIG. 5, FIG. 9, and/or FIG. 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communication, the apparatus comprising:
at least one processor; and
a memory coupled to the at least one processor, the memory comprising code executable by the at least one processor to cause the apparatus to:
determine, based on an indication, an energy per resource element (EPRE) ratio for a non-zero power (NZP) channel state information reference signal (CSI-RS) resource;
measure a channel based on the EPRE ratio and CSI-RSs associated with the NZP CSI-RS resource;
determine a numerator of a layer one signal to interference and noise ratio (L1-SINR) for the channel as a signal power measured on a channel measurement resource (CMR) associated with the NZP CSI-RS resource without the signal power being scaled based on the EPRE ratio for the NZP CSI-RS resource;
determine a denominator of the L1-SINR as a total received power on an interference measurement resource (IMR) associated with the NZP CSI-RS resource without the total received power being scaled based on the EPRE ratio for the NZP CSI-RS resource; and
report channel feedback based on the measuring, wherein the channel feedback includes the L1-SINR.

2. The apparatus of claim 1, wherein the indication indicates the EPRE ratio when the NZP CSI-RS resource is for a L1 reference signal received power (RSRP) measurement, and wherein the code executable by the at least one processor to cause the apparatus to measure the channel comprises code executable by the at least one processor to cause the apparatus to measure L1-RSRP for the channel.

3. The apparatus of claim 1, wherein the indication indicates the EPRE ratio when the NZP CSI-RS resource is for determining CSI feedback, and wherein the code executable by the at least one processor to cause the apparatus to measure the channel comprises code executable by the at least one processor to cause the apparatus to measure CSI for the channel.

4. The apparatus of claim 1, wherein the indication indicates the EPRE ratio when the NZP CSI-RS resource is for use as at least one of: a channel measurement resource (CMR), an IMR, or a L1-SINR measurement.

5. The apparatus of claim 1, wherein the code executable by the at least one processor further causes the apparatus to:
receive the indication via a radio resource control (RRC) message.

6. The apparatus of claim 1, wherein the code executable by the at least one processor further causes the apparatus to:
receive the indication in a medium access control (MAC) control element (CE).

7. The apparatus of claim 1, wherein the code executable by the at least one processor further causes the apparatus to:
receive the indication in downlink control information (DCI).

8. The apparatus of claim 1, wherein the EPRE ratio comprises a powerControlOffset ratio of a physical downlink shared channel (PDSCH) EPRE to NZP CSI-RS EPRE.

9. The apparatus of claim 1, wherein the EPRE ratio comprises a powerControlOffsetSS ratio of a NZP CSI-RS EPR to synchronization signal (SS) physical broadcast channel (PBCH) block EPRE.

10. The apparatus of claim 1, wherein the indication comprises a rule in a wireless communications standard.

11. The apparatus of claim 1, wherein the code executable by the at least one processor further causes the apparatus to:
measure reference signal received power (RSRP) for the NZP CSI-RS resource; and
use the RSRP for the NZP CSI-RS resource as a L1-RSRP without the RSRP being scaled based on the EPRE ratio for the NZP CSI-RS resource.

12. A method for wireless communication, the method comprising:
determining, based on an indication, an energy per resource element (EPRE) ratio for a non-zero power (NZP) channel state information reference signal (CSI-RS) resource;
measuring a channel based on the EPRE ratio and CSI-RSs associated with the NZP CSI-RS resource;
determining a numerator of a layer one signal to interference and noise ratio (L1-SINR) for the channel as a signal power measured on a channel measurement resource (CMR) associated with the NZP CSI-RS resource without the signal power being scaled based on the EPRE ratio for the NZP CSI-RS resource;
determining a denominator of the L1-SINR as a total received power on an interference measurement resource (IMR) associated with the NZP CSI-RS resource without the total received power being scaled based on the EPRE ratio for the NZP CSI-RS resource; and
reporting channel feedback based on the measuring, wherein the channel feedback includes the L1-SINR.

13. The method of claim 12, wherein the indication indicates the EPRE ratio when the NZP CSI-RS resource is for a L1 reference signal received power (RSRP) measurement, and wherein measuring the channel comprises measuring L1-RSRP for the channel.

14. The method of claim 12, wherein the indication indicates the EPRE ratio when the NZP CSI-RS resource is for determining CSI feedback, and wherein measuring the channel comprises measuring CSI for the channel.

15. The method of claim 12, wherein the indication indicates the EPRE ratio when the NZP CSI-RS resource is for use as at least one of: a channel measurement resource (CMR), an IMR, or a L1-SINR measurement.

16. The method of claim 12, further comprising:
receiving the indication via a radio resource control (RRC) message.

17. The method of claim 12, further comprising:
receiving the indication in a medium access control (MAC) control element (CE).

18. The method of claim 12, further comprising:
receiving the indication in downlink control information (DCI).

19. The method of claim 12, wherein the EPRE ratio comprises a powerControlOffset ratio of a physical downlink shared channel (PDSCH) EPRE to NZP CSI-RS EPRE.

20. The method of claim 12, wherein the EPRE ratio comprises a powerControlOffsetSS ratio of a NZP CSI-RS EPR to synchronization signal (SS) physical broadcast channel (PBCH) block EPRE.

21. The method of claim 12, wherein the indication comprises a rule in a wireless communications standard.

22. The method of claim 12, further comprising:
measuring reference signal received power (RSRP) for the NZP CSI-RS resource; and
using the measured RSRP for the NZP CSI-RS resource as a L1-RSRP without the RSRP being scaled based on the EPRE ratio for the NZP CSI-RS resource.

23. A non-transitory computer-readable medium comprising computer-executable instructions that, when executed by a processor of a user equipment, cause the user equipment to perform a method of wireless communications, the method comprising:
- determining, based on an indication, an energy per resource element (EPRE) ratio for a non-zero power (NZP) channel state information reference signal (CSI-RS) resource;
- measuring a channel based on the EPRE ratio and CSI-RSs associated with the NZP CSI-RS resource;
- determining a numerator of a layer one signal to interference and noise ratio (L1-SINR) for the channel as a signal power measured on a channel measurement resource (CMR) associated with the NZP CSI-RS resource without the signal power being scaled based on the EPRE ratio for the NZP CSI-RS resource;
- determining a denominator of the L1-SINR as a total received power on an interference measurement resource (IMR) associated with the NZP CSI-RS resource without the total received power being scaled based on the EPRE ratio for the NZP CSI-RS resource; and
- reporting channel feedback based on the measuring, wherein the channel feedback includes the L1-SINR.

24. The non-transitory computer-readable medium of claim 23, wherein the EPRE ratio comprises a powerControlOffset ratio of a physical downlink shared channel (PDSCH) EPRE to NZP CSI-RS EPRE.

25. The non-transitory computer-readable medium of claim 23, wherein the EPRE ratio comprises a powerControlOffsetSS ratio of a NZP CSI-RS EPR to synchronization signal (SS) physical broadcast channel (PBCH) block EPRE.

26. The non-transitory computer-readable medium of claim 23, wherein the method of wireless communications further comprises:
- measuring reference signal received power (RSRP) for the NZP CSI-RS resource; and
- using the measured RSRP for the NZP CSI-RS resource as a L1-RSRP without the RSRP being scaled based on the EPRE ratio for the NZP CSI-RS resource.

27. An apparatus for wireless communication, the apparatus comprising:
- means for determining, based on an indication, an energy per resource element (EPRE) ratio for a non-zero power (NZP) channel state information reference signal (CSI-RS) resource;
- means for measuring a channel based on the EPRE ratio and CSI-RSs associated with the NZP CSI-RS resource;
- means for determining a numerator of a layer one signal to interference and noise ratio (L1-SINR) for the channel as a signal power measured on a channel measurement resource (CMR) associated with the NZP CSI-RS resource without the signal power being scaled based on the EPRE ratio for the NZP CSI-RS resource;
- means for determining a denominator of the L1-SINR as a total received power on an interference measurement resource (IMR) associated with the NZP CSI-RS resource without the total received power being scaled based on the EPRE ratio for the NZP CSI-RS resource; and
- means for reporting channel feedback based on the measuring, wherein the channel feedback includes the L1-SINR.

* * * * *